US005226771A

United States Patent [19]

Gardner

[11] Patent Number: 5,226,771
[45] Date of Patent: Jul. 13, 1993

[54] APPARATUS AND METHOD FOR APPLYING HARD AND SOFT COVERS TO BOUND OR UNBOUND DOCUMENTS

[75] Inventor: John F. Gardner, Penfield, N.Y.

[73] Assignee: Xerox Corporation, Stamford, Conn.

[21] Appl. No.: 928,554

[22] Filed: Aug. 11, 1992

[51] Int. Cl.[5] .......................... B42B 5/00; B23P 19/04
[52] U.S. Cl. .......................................... 412/6; 412/9; 412/20; 412/33; 412/34; 29/253; 29/426.5
[58] Field of Search .................. 412/6, 19, 20, 33, 34; 29/239, 243.58, 253, 426.1, 426.5

[56] References Cited

U.S. PATENT DOCUMENTS 4,958,974 9/1990 Schenk ............................. 412/34 X
4,986,713 1/1991 Zoltner et al. ........................ 412/34

FOREIGN PATENT DOCUMENTS 2145033 3/1985 United Kingdom ................. 412/34

*Primary Examiner*—Mark Rosenbaum
*Assistant Examiner*—S. Thomas Hughes
*Attorney, Agent, or Firm*—Oliff & Berridge

[57] ABSTRACT

A book binding apparatus and method secures pages of a document in a U-shaped channel. The apparatus automatically adjusts the binding jaws of the apparatus to the current size of the channel prior to the binding force being applied to the channel. The operating forces generated by the apparatus in deforming the channel are limited by generating small amounts of deformation in the channel for each pull of an operating handle, and by using multiple pulls of the handle to completely secure the pages into the channel. A debinding apparatus and method, using the same mechanism as the binding apparatus, debinds the pages from the channel.

24 Claims, 10 Drawing Sheets

APPARATUS AND METHOD FOR APPLYING HARD AND SOFT COVERS TO BOUND OR UNBOUND DOCUMENTS

BACKGROUND OF THE INVENTION

1. Field of the Invention

This invention is directed generally to the binding and unbinding of books and in particular is concerned with improvements in the manner which hard and soft back covers are secured to and released from the pages of a book.

2. Description of Related Art

Sheet binding is one of the oldest known arts, and numerous methods and apparatuses are known in the art for permanently or temporarily securing sheets together. Most of these known methods and apparatus are only economically suited for high priced or high volume commercial printing operations.

U.S. Pat. No. 4,986,713 to Zoltner et al. (assigned to the same assignee and incorporate herein by reference) which describes a novel apparatus for applying preformed hard or soft covers to bound or unbound documents, provides a solution to many of these problems. However, this apparatus is still too complicated and uneconomical for the average business office environment. Particularly, this apparatus is poorly suited to very small (1-10) document sets and, due to its complexity, is susceptible to failure due to accidental misuse.

Further, due to the design of the Zoltner et al. device, the individual parts of the device must be robust enough to withstand the high forces generated within the Zoltner et al. device during the binding of a book. Consequently, the Zoltner et al. device is heavy and its parts are expensive both in materials and production costs. Finally, it is difficult for the average person to operate due to the high forces (up to 70 lbs.) which must be applied to a handle during the binding operation.

SUMMARY OF THE INVENTION

It is therefore an object of the present invention to provide for a binding apparatus of reduced complexity.

It is also an object of the present invention to provide for a binding apparatus which is less liable to failure through misuse.

It is yet another object of the present invention to provide for a binding apparatus suitable for small sets of documents.

It is another object of the present invention to provide for a binding apparatus which automatically adjusts to any size document.

It is yet another object of the present invention to provide a binding apparatus which is smaller and lighter than the conventional binding apparatus.

It is yet another object of the present invention to provide a binding apparatus which requires less force to operate than the conventional binding apparatus.

It is yet another object of the present invention to provide for a binding apparatus which is more economical than the conventional binding apparatus.

Accordingly, the binding apparatus of the present invention comprises deforming means for deforming the U-shaped channel member to secure the plurality of pages into the U-shaped channel upon application of a binding force to the deforming means and force applying means for positioning the deforming means in a preparatory position adjacent the U-shaped channel and for subsequently applying the binding force to the deforming means.

BRIEF DESCRIPTION OF THE DRAWINGS

The preferred embodiments will be described with reference to the drawings, in which like elements have been denoted with like reference numerals throughout the figures, and in which.

DETAILED DESCRIPTION OF THE PREFERRED EMBODIMENTS

Figure 1:
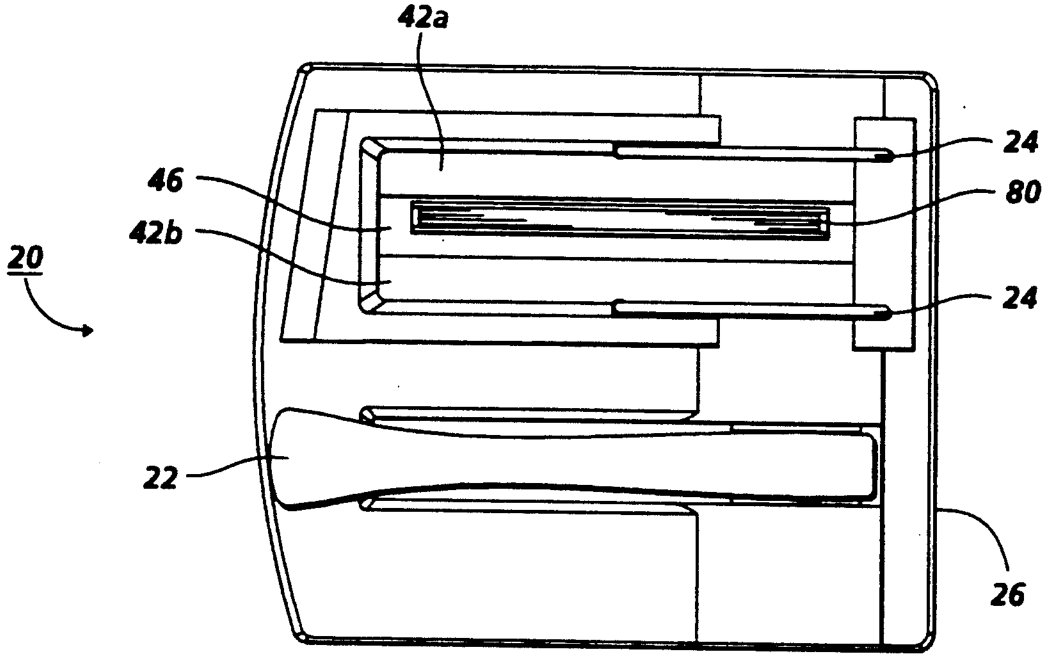
FIG. 1 is a top plan view of a binding apparatus of the present invention.
Figure 2:
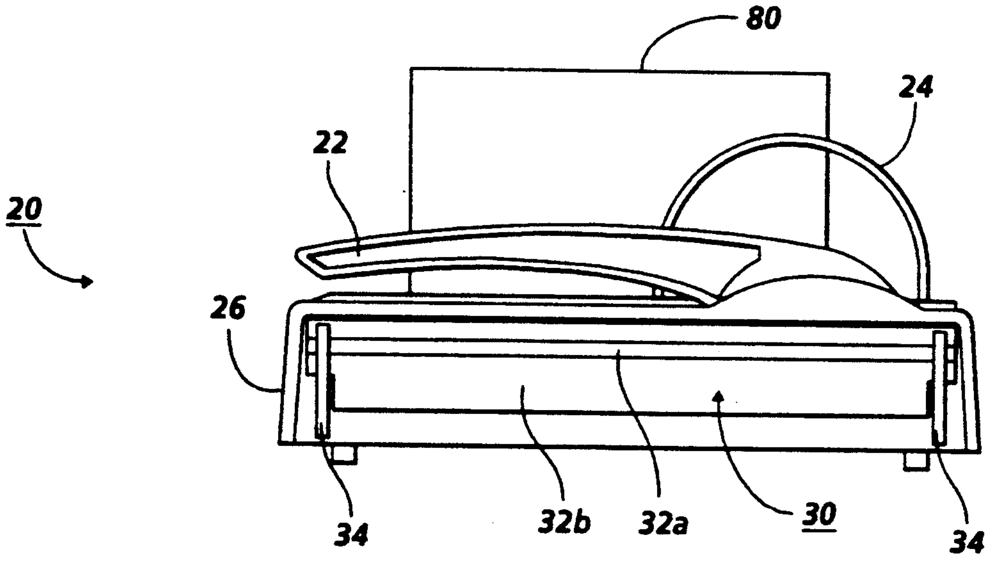
FIG. 2 is a side plan view of the binding apparatus of the present invention.
Figure 6:
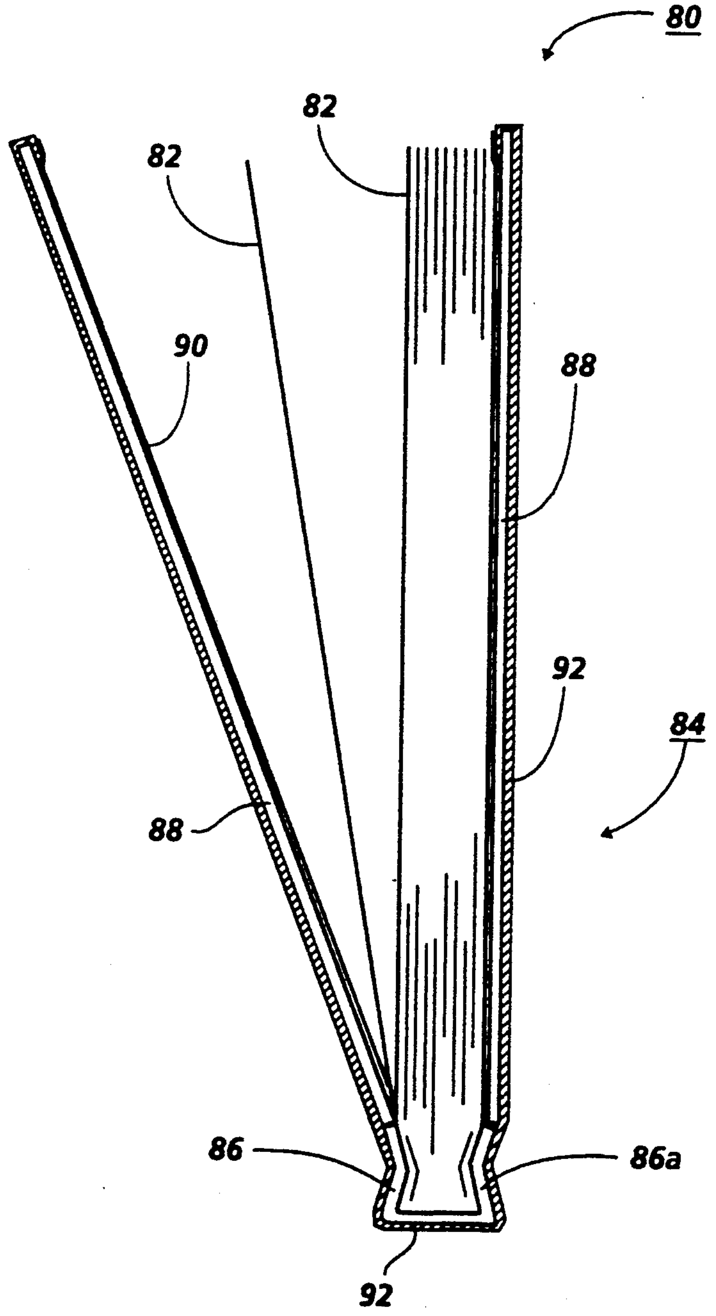
FIG. 6 is a sectional view of a book bound by the present apparatus.

FIGS. 1 and 2 show a top and side plan view of the preferred embodiment of the binder apparatus 20. As shown in FIG. 2, the handle 22, when in a substantially horizontal position, is in a binding position. When in the binding position, the movable jaw 42*b* is moved towards the fixed jaw 42*a* such that a book 80 supported by book supports 24 is forced into a bound condition. As shown in FIG. 6, the book 80 comprises pages 82 which are to be bound and the book cover assembly 84. The number of pages 82 which can be bound by the binding apparatus 20 is in the range of 5 to 1,000, and is determined by the maximum width of the gap between the fixed jaw 42*a* and the movable jaw 42*b* and the amount of motion provided by the flat cam 58 (FIGS. 3A-3D) of the mechanism assembly. In the preferred embodiment, the binding apparatus 20 is constructed to bind between 10 and 200 pages.

As shown in FIG. 6, the book cover assembly 84 is formed by connecting two hard covers 88 to a U-shaped soft steel channel member 86 with a paper or fabric spine member 92. The spine member 92 covers the outer surface of hard covers 88, wrapping around their edges. Heavy paper face plates 90 are attached to the outside edges of the hard covers 88. To construct a book 80, the pages 82 to be bound are placed into the U-shaped channel member 86 along with the free ends of the face plates 90. After the pages 82 are squared up and centered in the U-shaped channel member 86, the unbound book 80 is placed onto the support bed 46 of the binding apparatus 20. When the book 80 is placed into the binding apparatus 20, the handle 22 is in an upright, non-binding position as shown in FIG. 3A.

Figure 3A:
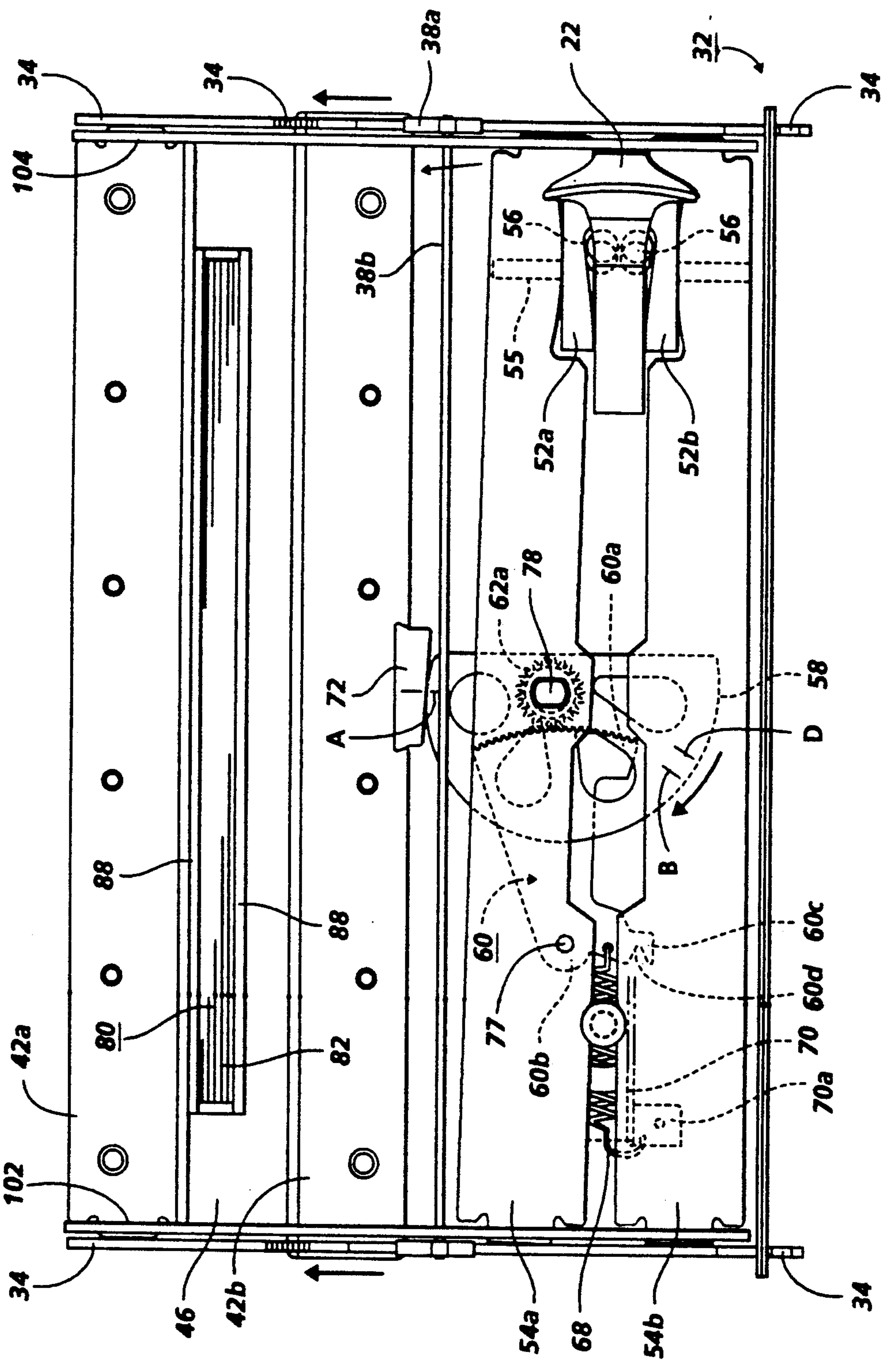
FIGS. 3A-3D are top plan views of the binding apparatus of the present invention with the top cover removed and in various stages of operation.
Figure 3B:
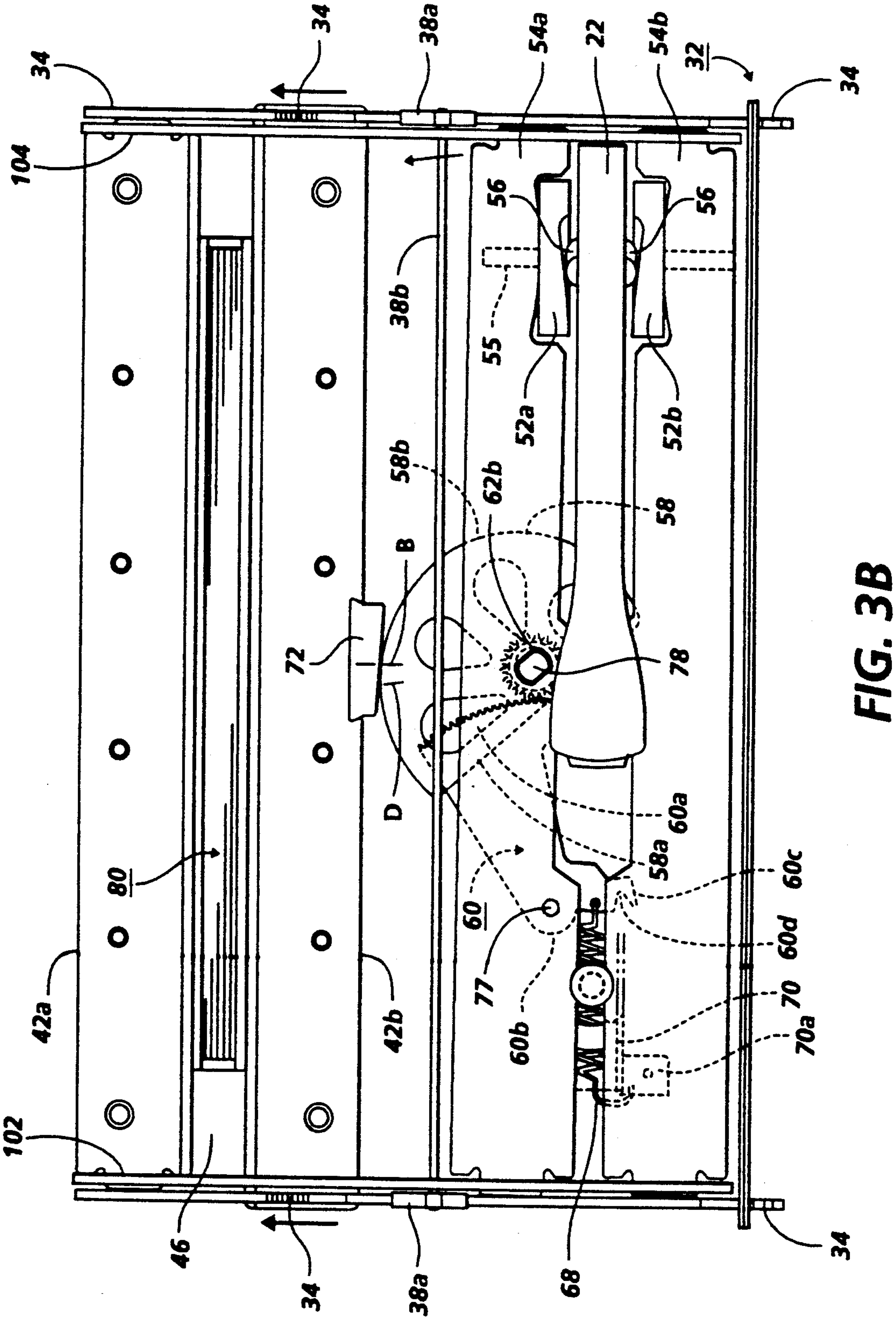
Figure 3C:
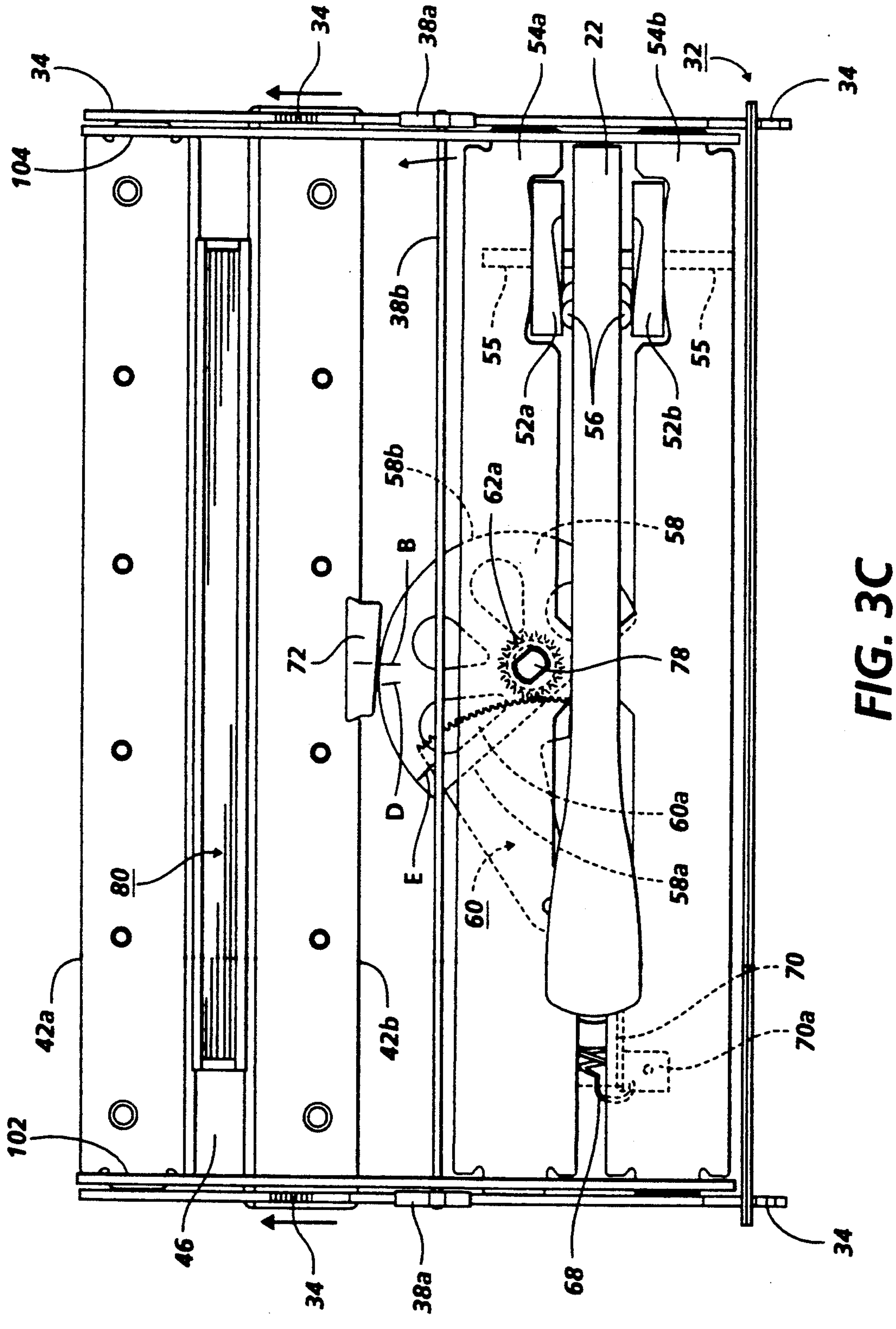

To bind the book 80, the handle 22 is moved from the vertical non-binding position shown in FIG. 3A to the horizontal binding position shown in FIGS. 1, 2 and 3C. From the action of the mechanism assembly 50, described below, the movable jaw 42*b* is moved towards the fixed jaw 42*a* such that the U-shaped channel member 86 is bent inwardly, catching and compressing the pages 82. The jaws 42*a* and 42*b* bear against the U-shaped channel member 86 through the spine member 92 at approximately the top quarter of the length of the uprights 86*a* of the U-shaped channel member 86. Because the U-shaped channel member 86 is made of soft steel (as opposed to spring steel), the force of the jaws 42*a* and 42*b* plasticly deform the U-shaped channel member. As the uprights of the U-shaped channel member 86 plasticly deform as they are forced toward each other by the jaws 42*a* and 42*b*, the paper pages 82 and face plates 90 are compressed between the approaching uprights 86*a* of the U-shaped channel member 86.

When the handle 22 is returned to the vertical non-binding position, the plasticly deformed soft steel U-shaped channel member 86 undergoes a minimal amount of elastic spring back. However, because the pages 82 were also compressed during the binding operation, they also elastically spring back, thereby ensuring that the pages 82 are securely bound within the U-shaped channel member 86.

In the preferred embodiment, the binding stroke of the movable jaw 42*b* is less than the full amount of stroke necessary to completely bind the book 80. This reduced binding stroke minimizes the force necessary to move the handle 22 from the vertical non-binding position to the horizontal binding position. However, in order to securely bind the book 80, multiple strokes of the movable jaw 42*b* against the U-shaped channel member 86 are required. Furthermore, for each binding stroke of the handle 22, the movable jaw 42*b* must begin its next binding stroke at essentially the same position where it ended the previous binding stroke, up to the point at which the U-shaped channel member 86 is completely plasticly deformed such that no further compression of the pages 82 is possible, thereby completely binding the book 80.

Figure 3D:
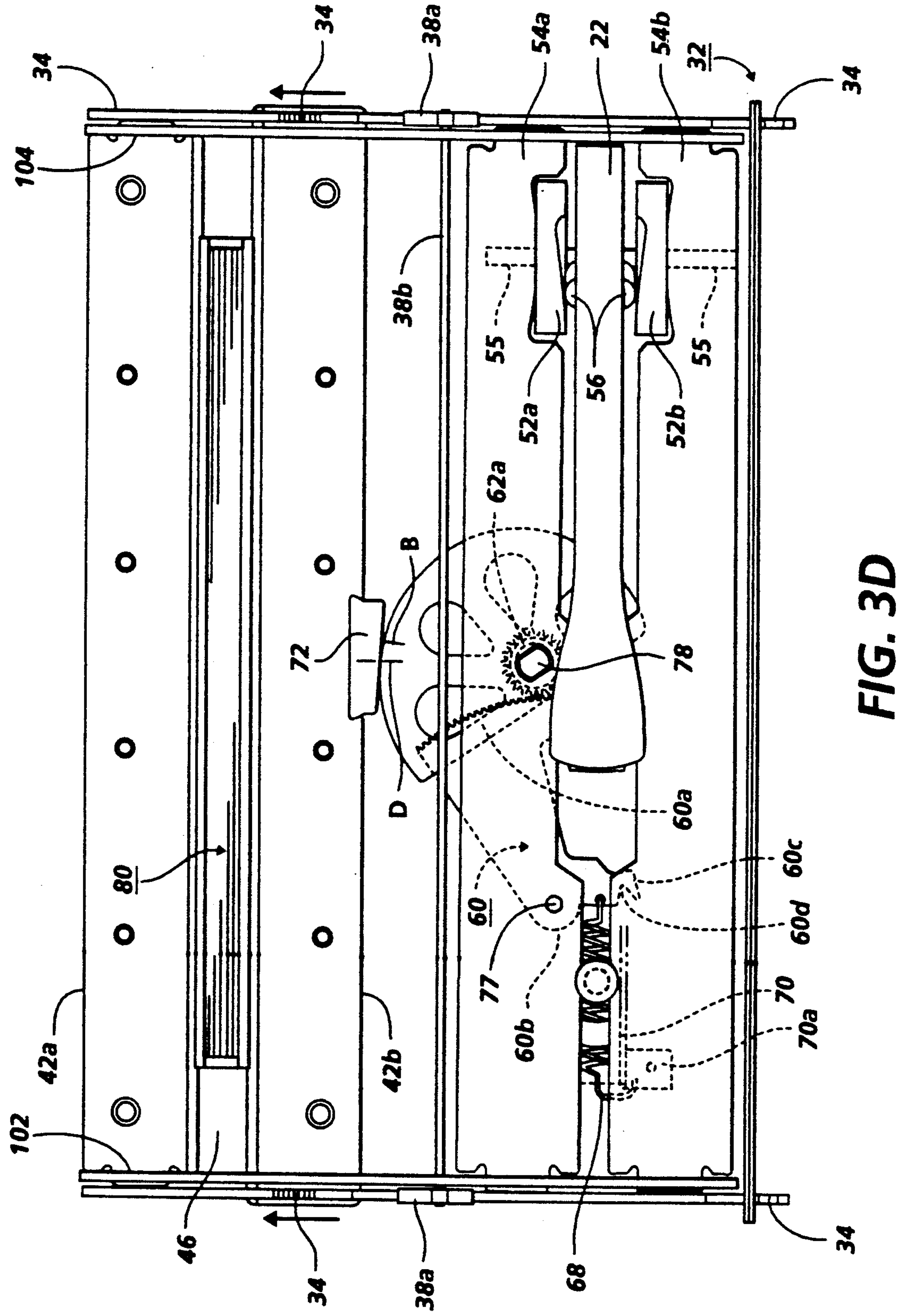
Figure 4A:
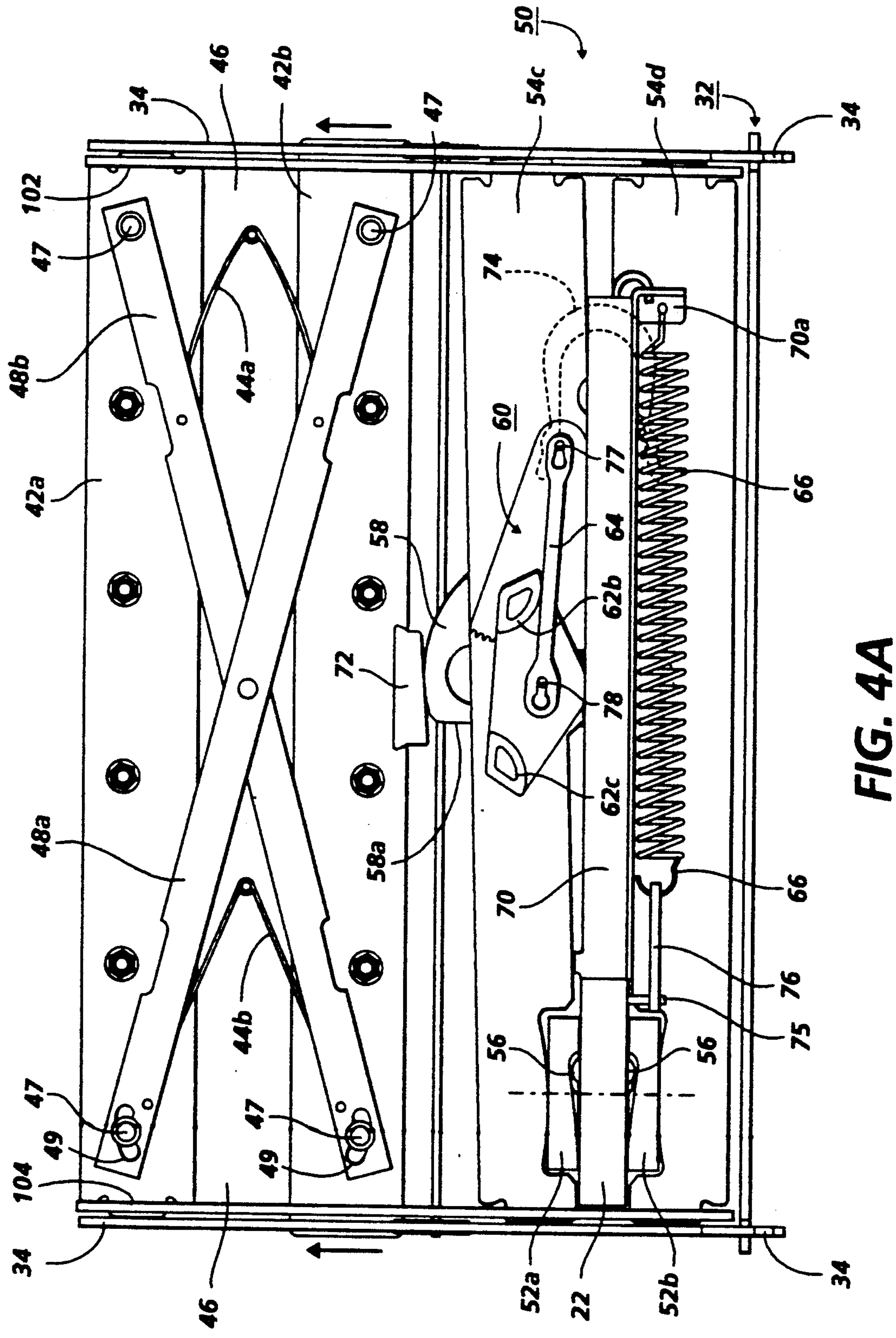
FIGS. 4A-4B are bottom plan views of the binding apparatus of the present invention.

The apparatus for providing for this multiple binding stroke is described below with respect to FIGS. 3A–3D and 4A–4B. As shown in the top view of FIG. 3A and the bottom view of FIG. 4A, at the beginning of a binding operation the movable jaw 42B is located at its fully open position furthest from fixed jaw 42*a*. The parallelism of the travel between the fully open and full closed positions of movable jaw 42*b* is controlled by the location and shape of the voids 49 formed at the first ends of scissor bars 48*a* and 48*b*. In the preferred embodiment, the voids 49 are curved. Two shoulder screws 47 are located within the voids 49 to attach the scissor bars 48*a* and 48*b* to the fixed and movable jaws 42*a* and 42*b*. The second ends of the scissor bars 48*a* and 48*b* are rotatably connected to the fixed and movable jaws 42*a* and 42*b* by two additional shoulder screws 47, as shown in FIG. 4A. The scissor springs 44*a* and 44*b* are connected to the scissor bars 48*a* and 48*b* and bed assembly pins 45. The symmetrical motion of the springs 44*a* and 44*b* keeps the moveable bed 46 centered with respect to the jaws 42*a* and 42*b* during the first phase of operation. The movable bed 46 moves relative to both the fixed and movable jaws 42*a* and 42*b* and is pivotably attached to the scissor arms 48*a* and 48*b*. The scissor springs 44*a* and 44*b* provide a biasing force for forcing the movable jaw 42*b* away from the fixed jaw 42*a* towards the fully open position. The amount of travel of the movable jaw 42*b* is determined by the shape of cam 58 and the amount of cam rotation provided for by stops 62*b* and 62*c*. In the fully closed position, the jaw frame is also restricted by the slots provided in frame members 102 and 104. Alternatively, the amount of travel of movable jaw 42*b* can be determined by the length of the voids 49, with the shoulder screws 47 bearing against the outer edge of the voids 49 when the movable jaw is at its fully open position and against the inner edge of the voids 49 when the movable jaw 42*b* is in its fully closed position.

In order to move the movable jaw 42*b* towards the fixed jaw 42*a*, against the biasing force of the scissor springs 44*a* and 44*b*, and to provide the force necessary to plasticly deform the soft steel U-shaped channel 86, a flat cam 58 rides against a wear plate 72 provided on the movable jaw 42*b*. As shown in FIGS. 3A and 4A, when the handle 22 is in the vertical non-bearing position, the flat cam 58 has its flat non-bearing portion 58*a* closest to and perpendicular to the handle such that point A of the bearing surface 58*b* of flat cam 58 is in contact with the wear plate 72. As shown in FIGS. 3C and 4A, a pinion/-stop assembly 62 having a pinion gear 62*a* and stops 62*b* and 62*c* is fixedly connected by a cam shaft 78 to the flat cam 58. The pinion gear 62*a* meshes with a sector gear 60. The sector gear 60 is an arcuate sector of a circular gear. The sector gear 60 provides for a 1:10 gear ratio to the pinion gear. The sector gear provides an arc in the range of 5° to 30° of an entire 360° gear. Likewise, the flat cam provides for a corresponding arc in the range of rotation between 50° and 300°. In the preferred shown in FIG. 3A–3B and 4A–4B, the sector gear is 18° in arc and the flat cam 58 provides for a corresponding amount of rotation of at least 180°.

In operation, the mechanism assembly 50 provides for a two-stage binding operation each time the handle 22 iis moved from the vertical non-binding position to the horizontal binding position. In the first stage of operation, the movable jaw 42*b* is rapidly moved towards the fixed jaw 42*a* to firmly grasp the book 80, as shown in FIGS. 3B and 3D. In FIG. 3B, the handle 22 has been depressed approximately one quarter of the way from the vertical position to the horizontal position, causing the flat cam 58 to rotate from bearing against the wear plate at point A on the bearing surface 58*a* to bearing at point B on the bearing surface 58*a* of the flat cam 58. The point B represents the amount of rotation the flat cam 58 must undergo to adjust the movable jaw 42*b* from the fully open position to a binding position. The particular amount of rotation of flat cam 58 required to adjust the movable jaw 42*b* to contact any particular book 80 is necessarily dependent upon the particular thickness of the book 80. Accordingly, the exact position of the point B and the position of the handle necessary to move the flat cam 58 to the point B is dependent upon the thickness of the book as well.

Figure 4B:
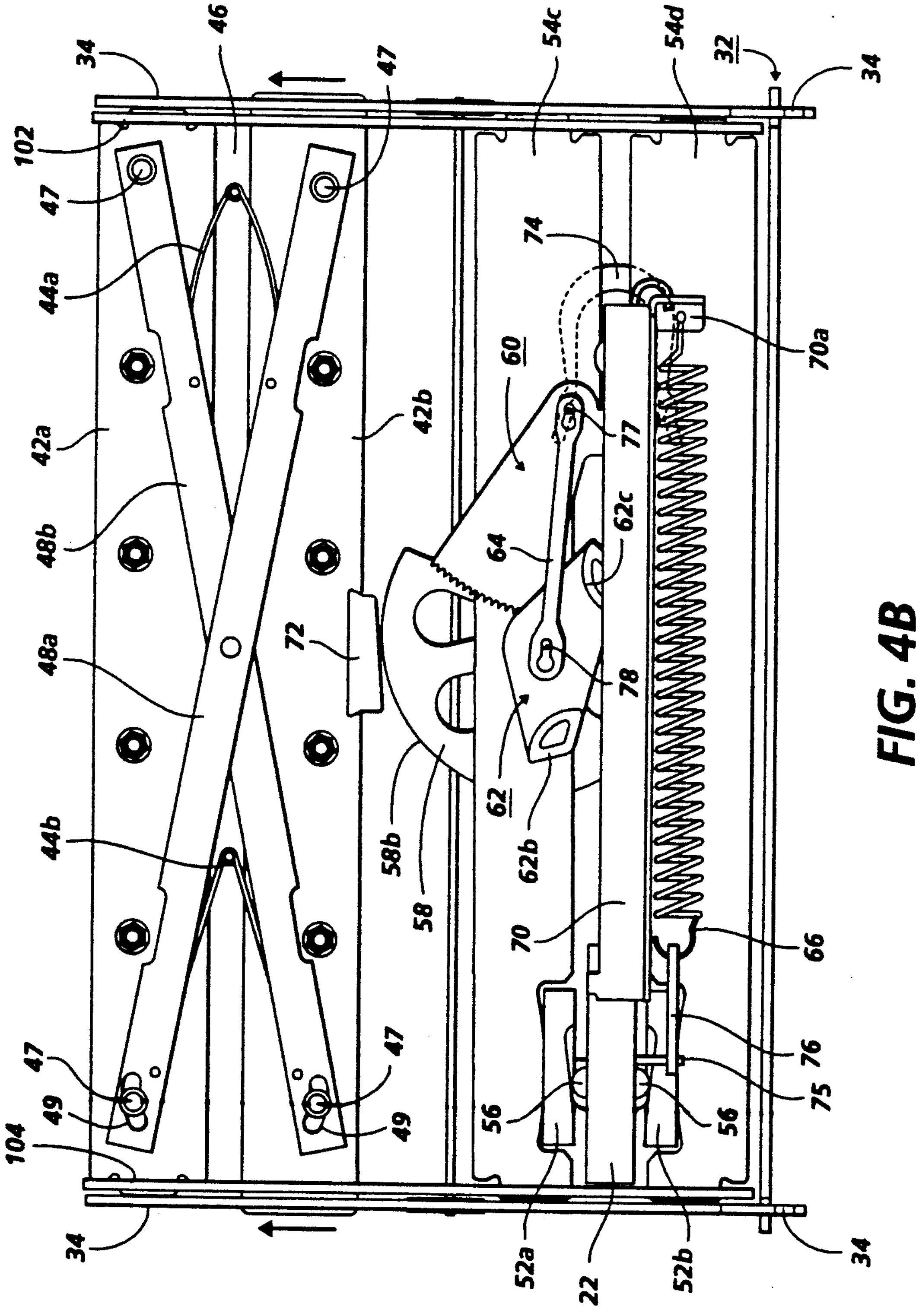

FIGS. 3A–3D show a top view of a mechanism assembly 50, with the flat cam 58, the sector gear 60, the pinion gear 62*a* and a retaining spring 68 (shown in hidden line when necessary) under the upper lever arms 54*a* and 54*b*. FIGS. 4A–4B show a plan bottom view of the mechanism assembly 50 with the flat cam 58 again shown in hidden line above the lower lever arms 54*c* and 54*d* (when necessary), while the sector gear 60, the pinion-stop assembly 62, the stop link 64, the actuating spring 66 and the actuator arm 70 are visible. The flat cam 58 is fixedly supported on the cam shaft 78 between the left side lever arms 54*a* and 54*c*. The cam shaft 78 extends below the lower lever arm 54*c* to provide a notch portion for fixedly supporting the pinion-stop assembly. A further portion of the cam shaft 78 extends downwardly for retaining a first end of the stop link 64. A first pair of holes are provided in the left lever arms 54*a* and 54*c* and the cam shaft 78 is rotatably supported therein.

The gear end 60*a* of the sector gear 60 engages the pinion gear 62*a* of the pinion-stop assembly 62, and pivots at its second end 60*b* on sector post 77. As shown in FIGS. 4A–4B, the pinion-stop assembly 62 and sector gear 60 lie below the lower lever arms 54*c* and 54*d*. The stop link 64 connects to the sector post 77 and the cam shaft 78 to both hold the pinion-stop assembly 62 and a sector gear 60 onto their respective shafts and to provide a bearing surface for the stops 62*b* and 62*c*. The stop 62*b* is arranged on the stop assembly 62 so that when the handle is moved toward the vertical non-binding position, the flat cam 58 can rotate only as far as point A. Likewise, depending on the amount of rotation to be provided by the flat cam 58, the second stop 62*c* is arranged on the pinion-stop assembly 62 so that the flat cam 58 can be rotated no further than a point E, which represents position of the flat cam 58 for a complete bind for a minimal number of pages 82 in the book 80.

To actuate the sector gear 60 and thereby move the flat cam 58 from point A to at least point B, an actuator arm 70 and actuating spring 66 are used to connect the handle 22 to the sector gear 60. As shown in FIGS. 4A–4B, the actuator spring 66 is connected to the handle 22 by means of the spring link 76 and the spring pin 75. The other end of the actuating spring 66 is attached to the actuator arm 70 at tab 70*a*. The actuator arm 70 is then connected to the sector gear 60 by means of a slot in a sidewall of the actuator arm 70, which is mated with a third end 60*c* of the sector gear 60. The third end 60*c* extends from the second end 60*b* of the sector gear 60 at a generally right angle to the gear end 60*a* of the sector gear 60. As shown in FIG. 3A, a free end of the third end 60*a* of the sector gear has a trapezoidal notch 60*d* formed therein for mating with the slot in the actuating arm 70. Just inside of the trapezoidal notch 60*d*, a retaining hole is provided. As shown in FIGS. 3A–3D, the retaining spring 68 is attached to the sector gear 60 by means of the retaining hole. The other end of the retaining spring 68 is attached to the vertical section of tab 70*a* of actuating arm 70 as shown in FIGS. 3A–3D and 4A–4B.

In operation, when the handle 22 is moved from its vertical non-binding position towards the horizontal binding position, the spring pin 75 is rotated away from the sector gear 60. Due to the high spring force of the actuating spring 66, the actuating spring 66 during the first phase of operation acts as a rigid link, pulling the actuator arm 70 towards the handle 22. The back edge of the slot in the actuating arm 70 engages the trapezoidal notch 60*d* in the third end 60*c* of the sector gear 60 causing the sector gear 60 to rotate counter-clockwise about the sector post 77.

Accordingly, the gear end 60*a* of the sector gear 60, which is engaged with the pinion gear 62*a*, rotates the pinion-stop assembly 62 clockwise, and with it the cam shaft 78 and flat cam 58. As flat cam 58 rotates clockwise to point B it continually bears against the wear block 72 and forces the movable jaw 42*b* towards the fixed jaw 42*a*. Eventually, as shown in FIG. 3B, at point B the book 80 is firmly grasped between the fixed jaw 42*a* and the movable jaw 42*b*.

Since the movable jaw 42*b* can no longer freely move, further rotation of the flat cam 58 rapidly increases the force of friction between wear plate 72 and the flat cam 58. Accordingly, any further movement of the handle 22 towards the horizontal binding position provides sufficient force to overcome the stiffness of the actuating spring 66, causing the actuating spring 66 to extend rather than to continue to act as a rigid link. Therefore, even though the handle 22 continues to rotate to the horizontal binding position, the flat cam 58 does not rotate further. Because the rotation of the flat cam 58 is used solely to move the movable jaw 42*b* into a binding position, and the rotation of the flat cam 58 is not used to provide any of the binding force necessary to plasticly deform the soft steel U-shaped channel 86, none of the pinion-stop assembly 62, the stop link 64, the sector gear 60 or the sector post 77 are required to be of robust, high strength materials. Accordingly, the materials, cost, weight and production costs of these parts can be significantly reduced.

Figure 7:
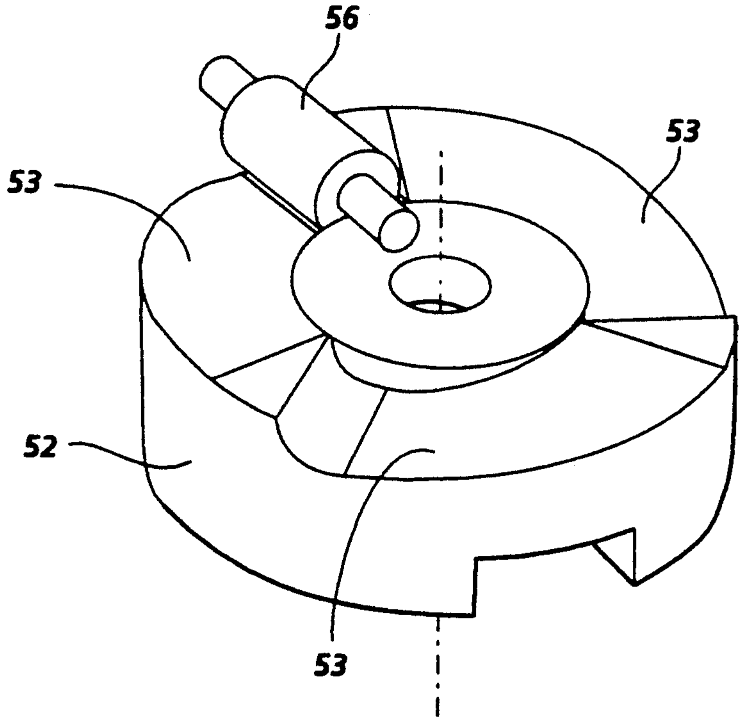
FIG. 7 is a perspective view of one of the face cams of the present invention.

In the second, binding phase of the operation of the binding apparatus 20, the binding force is provided by the interaction between the face cams 52*a* and 52*b* and the six rollers 56. The six rollers 56 are divided into three pairs of rollers, which are set into handle 22 and circumferentially spaced at 120° intervals around the pivot shaft 55. The face cams 52*a* and 52*b* are provided with three sets of ramps and stops. As shown in FIG. 7, the sets of ramps and stops of the face cams 52*a* and 52*b* are also distributed at 120° intervals around the pivot shaft 55 and provide a bearing surface for the rollers 56. As shown in FIG. 3A, and for each set of rollers 56, the rollers 56 bear against each other and the ramps of the face cams 52*a* and 52*b*. Since the face cams 52*a* and 52*b* and each set of rollers 56 provides a linear set of bearing points, the handle 22 does not absorb any of the binding force, and can be made of material merely strong enough to hold the rollers 56 in a fixed position relative to the handle as the handle is moved to and from the binding position. As shown in FIG. 7, the face cams 52*a* and 52*b* are slotted on their faces away from the handle 22, so that the face cams 52*a* and 52*b* can be fitted onto the lever arms 54*a*, 54*c* and 54*b*, 54*d*, respectively.

In the first phase of operation, as shown in FIGS. 3A, 3B and 3D, as handle 22 is moved from the vertical non-binding position towards the horizontal binding position, the movement of the rollers 56 along the ramp surfaces of face cams 52*a* and 52*b* forces the left lever arms 54*a* and 54*c* away from the right lever arms 54*b* and 54*d*. While it is understood that the movement of lever arms 54*a* and 54*c* provides some of the overall adjustment mechanism of the first phase of the binding operation, the action of the flat cam 58 provides substantially all of the adjustment to the movable jaw 42*b*.

However, once the binding mechanism enters the second phase of the operation, wherein the friction between the wear plate 72 and the flat cam 58 prevents any further rotation of the flat cam 58, an essentially rigid link has been created between the movable jaw 42*b*, the flat cam 58 and the left lever arms 54*a* and 54*c*. Accordingly, as the further rotation of the handle 22 towards the horizontal binding position forces the rollers 56 along the ramp surfaces of face cams 52*a* and 52*b*, the lever arms 54*a* and 54*c* are forced away from the lever arms 54*b* and 54*d*, thereby forcing the movable jaws 42*b* towards the fixed jaw 42*a*. This then causes the soft steel U-shaped channel member 86 to plasticly deform.

Because the angle of the ramps on the face cams 52*a* and 52*b* is small, the total amount of expansion of the lever arms 54*a*–54*d*, approximately 7 mm–9 mm in the preferred embodiment, is provided by the face cams 52*a* and 52*d* and rollers 56. Each set of left or right lever arms provides about one-half (3.5 mm–4.5 mm) of the expansion. This amount of expansion is further reduced by the lever ratio between the pivot point of the cam shaft 78 and the pivot point of the face cams about the pivot shaft 55. In the preferred embodiment, the lever ratio is approximately 1:2.

As shown in FIGS. 4B and 3C, when the handle is in the horizontal binding position, the actuating spring 66 is stretched and the movable jaw **42*b* is moved an additional distance towards the fixed jaw 42*a*, while no further rotation of the flat cam 58 is made. When the handle is returned to the vertical non-binding position, first the extension of the actuating spring 66 is released and the rollers 56 are moved down the ramps on the face cams 52*a* and 54*b*, thereby removing the binding force from against the movable jaw 42*b*. The scissor springs 44*a* and 44*b* force the movable jaw 42*b* away from the fixed jaw 42*a* and the book 80. Once the rotation of the handle 22 towards the vertical binding position releases tension from the actuating spring 66, the retaining spring 68 then pulls the sector gear clockwise, forcing the actuating arm 70 away from the handle 22. As the handle 22 is rotated towards the vertical binding position, the sector gear 60 rotates clockwise, causing the flat cam 58** to rotate counterclockwise to its initial point A.

When the handle 22 is again moved towards the horizontal binding position, as shown in FIG. 3D, the flat cam 58 now rotates an additional distance, indicated by point D, before the movable jaw **42*b* firmly forces the fixed jaw 42*a* against the book 80. This additional distance of movement of the jaw 42*b* is equal to the amount of plastic deformation of the soft steel U-shaped channel member 86 (less the minimal amount of spring back) that was accomplished in the previous binding operation(s). When the handle 22 is again fully depressed to the horizontal binding position, an additional amount of plastic deformation of the soft steel U-shaped channel member 86 is accomplished, thereby providing for additional compression of the pages 82** and a tighter bind.

Eventually, after additional full binding operations, the plastic deformation of the soft U-shaped channel member 86 has maximally compressed the pages 82. Accordingly, any further binding operations will not provide for a tighter bind. However, if the binding apparatus were to provide for a perfectly rigid link between the lever arms **54*a*-54*d* and the movable jaw 42*b*, it is possible that continued binding operations would continue to plasticly deform the soft steel U-shaped channel member 86 to the point where it would physically cut into the pages 82**.

Accordingly, to avoid this problem, in the preferred embodiment the lever arms **54*a*-54*d* have additional cut-outs, as shown in FIGS. 3C-3D and 4A-4B, so that they are not perfectly rigid in the horizontal plane. The shapes of the cut-out portions are determined according to the particular lever arm flexibility requirements of the design, in order to increase the flexibility of the lever arms 54*a*-54*d*. Alternatively, the flexibility of the lever arms 54*a*-54*d* can be controlled by determining the thickness of the lever arms rather than the width. Accordingly, the lever arms 54*a* and 54*c* will flex between the cam shaft 78 and the pivot shaft 55, while the lever arms 54*b* and 54*d* will flex over their entire length. This allows for the lever arms to absorb the full amount of expansion caused by the rollers 56 moving along the ramps of the face cams 52*a* and 52*b* without forcing any further movement of the movable jaw 42*b*. Of course, it is understood that the lever arms 54*a*-54*d* cannot be made so flexible such that they flex (more than a minimal amount) during a normal binding operation and interfere with the application of the binding force by the movable jaw 42*b* against the U-shaped channel member 86**.

In the preferred embodiment, the binding apparatus 20 also includes a debinding apparatus 30 which is detachable connectable to the movable jaw **42*b*. Accordingly, the handle 22 and mechanism assembly 50** can be used to provide the binding operation as well as a debinding operation described below.

Figure 5A:
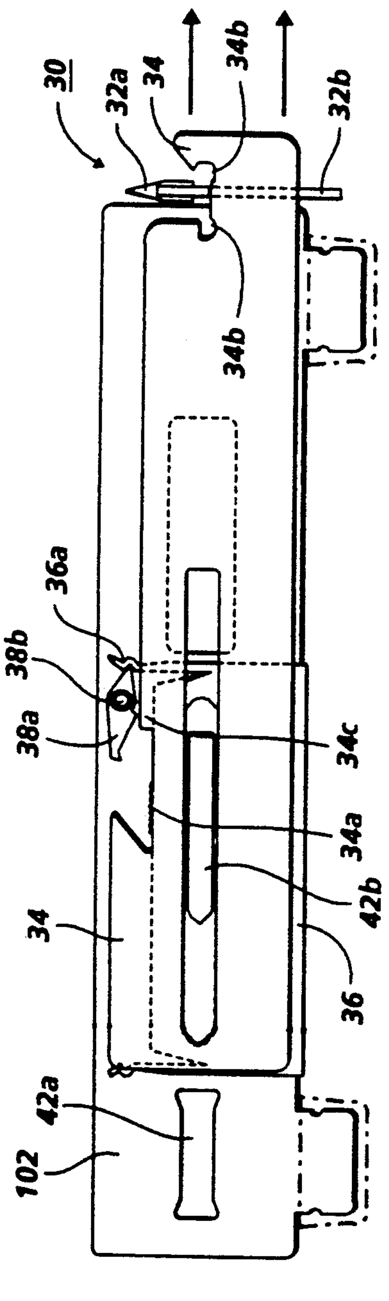
FIGS. 5A-5B are side plan views of the debinding apparatus of the present invention.
Figure 5B:
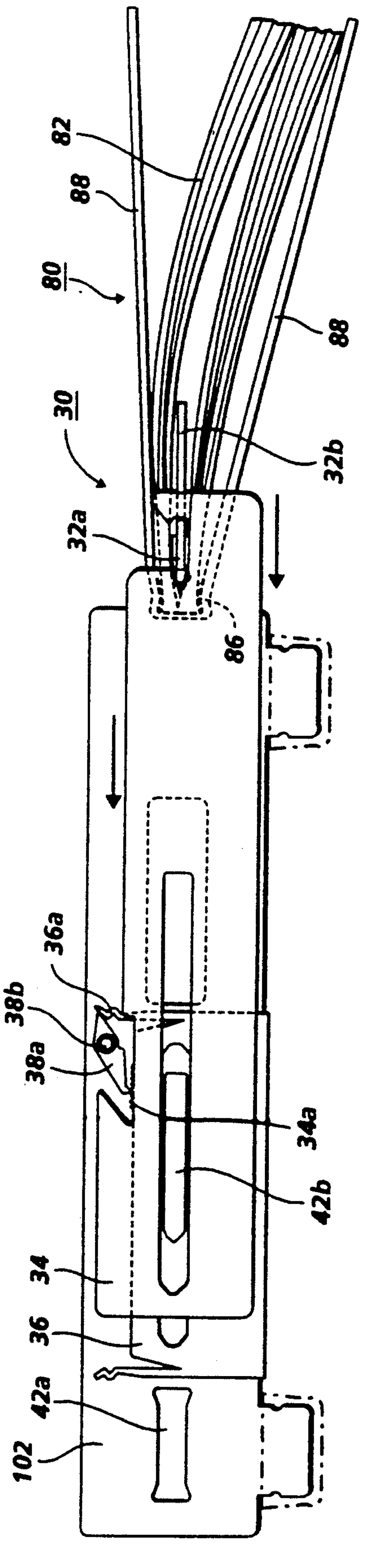

As shown in FIGS. 5A and 5B, the debinding apparatus 30 comprises a wedge 32 having a wedge head **32*a* and a wedge support 32*b*, a pair of debinder arms 34 located outside of the front frame member 102 and the rear frame member 104, a pair of guide members 36 located between the debinder arms 34 and the front and rear frame members 102 and 104 and a pair of pawls 38*a* . The pawls 38*a* are pivotably supported on a pawl rod 38*b*. The guides 36 and the debinder arms 34 and front and rear frame members 102 and 104 are provided with slots through which the movable jaw 42*b* extends. When the debinder apparatus 30 is in a non-debinding position, as shown in FIG. 5A, the movable jaw 42*b* is free to move within the slots provided in the debinder arms 34 without contacting them. Also in this position, the pawl 38*a* is retained in a non-racheting position by a clip portion 36*a* formed in guide 36. The wedge 32 is stored in an upright position in wedge retaining portions 34*b* formed in the rightmost ends of the debinder arms 34**.

To operate the debinding apparatus 30, the debinder arms 34 are moved to the right as shown in FIG. 5B, so that they extend beyond the right hand edge of the front and rear frame members 102 and 104. When each debinder arm 34 is moved to the right, a pawl releasing portion **34*c* formed in the debinder arm 34 contacts the pawl 38*a* and forceably releases it from the clip portion 36*a*. Once released from the clip portion 36*a*, the pawl 38*a* engages a teeth portion 34*a* formed on the debinder arm 34. When the pawls 38*a* are engaged with the teeth portions 34*a*, the freedom of the debinder arms 34 to move to the right is constrained. At the beginning of a debinding operation, the pawls 34*a* engage the leftmost teeth of the teeth portions 34*a***.

To debind a bound book, the book 80 is inserted horizontally between the debinder arms 34. The book 80 is opened at approximately the center point of the pages 82, and the wedge 32 is inserted therein so that it lies within the wedge retaining portions **34*b* of the retaining arms 34. Each wedge retaining portion 34*b* has a front overhang and a rear overhand, such that when the wedge 32 is inserted therein, the wedge support 32*b* lies under each of the overhangs. This ensures that the wedge 32 remains in a horizontal position during the debinding operation. When the debinding operation is completed, the wedge can be moved forward slightly so that the wedge support 32*b* no longer lies underneath the rear overhangs and can be removed from the wedge retaining portion 34*b***.

To debind a bound book 80, once the wedge 32 has been firmly inserted into the wedge retaining portion **34*b*, the handle 22 is depressed from the non-binding position to the binding position, thereby forcing the movable jaw 42*b* towards the fixed jaw 42*a*, as described above. As the movable jaw 42*b* moves towards the fixed jaw 42*a*, it engages the debinder arms 34, forcing them leftwards. As the debinder arms 34 are forced leftwards, the wedge retaining portions 34*b* engage the wedge support 32*b* and force the wedge 32 leftwards, thereby forcing the book 80** leftwards. However, as the book 80 is forced leftwards, it encounters the front and rear frame members 102 and 104 (and a vertical portion of the cover 26) such that it cannot continue to move leftwards.

Accordingly, the wedge head 32a of the wedge 32 is forced between the uprights 86a of the U-shaped channel member 86, causing them to spread outwardly. It is important to note that the wedge head 32a must be steep enough in order to generate a sufficient amount of spread in the U-shaped channel member 86 to release the bound pages 82. It is also important to note that the wedge head 32a of the wedge 32 must also have a very low coefficient of friction on its bearing surface, in order to avoid crushing or bending any of the pages 82. That is, the coefficient of friction between any two pages 82 must always be greater than the largest possible coefficient of friction between the wedge head 32a and the pages 82. Accordingly, it is anticipated in the preferred embodiment that the wedge head 32a will be made with Acetel or a like low friction material.

After the handle 22 has reached the full binding position, it is returned to the vertical non-binding position, the debinder arms 34 having been forced a small distance to the left. As the movable jaw 42b moves to the right as the handle 22 move toward the vertical non-binding position, the pawls 38a engage the teeth portions 34a to prevent the debinder arms 34 from moving back to the right. Each subsequent operation of the handle 22 towards the binding position forces the movable jaw 42b and, therefore the debinder arm 34, further to the left, progressively forcing the U-shaped channel member apart as the wedge 32 is drawn deeper into the U-shaped channel member 86. Eventually, the wedge head 32a will contact the bottom of the U-shaped channel member 86, thereby fully debinding the pages 82 from the book 80. At this point, the wedge 32 and book 80 are removed from the wedge retaining portion 34b and the debinder arms 34 are pushed to the left, moving them to their non-binding position. The pawls 38a, which are designed solely to hold the debinder arms 34 against a rightward force, click over the teeth 34a and are eventually forced by edges 34d of the debinder arms 34 back into the retaining position where they are retained by the clip portions 36a of the guides 36.

Accordingly, as set forth above, the same binding mechanism 20 used to bind the books 80 can be used to debind the books 80, without resort to additional intricate or complicated link members.

Although the invention has been described in detail, it will be apparent to those skilled in the art that various modifications may be made without departing from the scope of the invention, which is outlined in the following claims.

What is claimed is:

1. A binding apparatus for binding a plurality of pages with a U-shaped channel member, comprising:
- deforming means for deforming the U-shaped channel member to secure the plurality of pages into the U-shaped channel upon an application of a binding force to the deforming means; and
- force applying means for positioning the deforming means in a preparatory position adjacent the U-shaped channel and for subsequently applying the binding force to the deforming means,
- wherein the deforming means comprises a fixed jaw;
- a movable jaw; and
- connection means for movably connecting the fixed and movable jaws to each other, the connection means comprising a pair of scissor arms connected to each other.

2. The binding apparatus of claim 1, further comprising a debinding apparatus, the debinding apparatus comprising:
- a debinding force transforming means, engageable with the deforming means, for transforming the binding force to a debinding force; and
- wedge means, engageable with the debinding force transforming means, for uncrimping the U-shaped channel member upon an application of the debinding force.

3. A binding apparatus for binding a plurality of pages with a U-shaped channel member, comprising:
- deforming means for deforming the U-shaped channel member to secure the plurality of pages into the U-shaped channel upon an application of a binding force to the deforming means; and
- force applying means for positioning the deforming means in a preparatory position adjacent the U-shaped channel and for subsequently applying the binding force to the deforming means,
- wherein the deforming means comprises a fixed jaw, a movable jaw and connection means for movably connecting the fixed and movable jaws to each other, the connection means comprising a pair of scissor arms, each scissor arm pivotably connected at a first end to one of the fixed and movable jaws and having a void formed at a second end, and a pair of pin members, each pin member extending through one of the voids to slidably connect one of the scissor arms to the other of the fixed and movable jaws.

4. A binding apparatus for binding a plurality of pages with a U-shaped channel member, comprising:
- deforming means for deforming the U-shaped channel member to secure the plurality of pages into the U-shaped channel upon an application of a binding force to the deforming means; and
- force applying means for positioning the deforming means in a preparatory position adjacent the U-shaped channel and for subsequently applying the binding force to the deforming means,
- wherein the deforming means comprises a fixed jaw;
- a movable jaw;
- connection means for movably connecting the fixed and movable jaws; and
- biasing means for biasing the movable jaw away from the fixed jaw.

5. A binding apparatus for binding a plurality of pages with a U-shaped channel member, comprising:
- deforming means for deforming the U-shaped channel member to secure the plurality of pages into the U-shaped channel upon an application of a binding force to the deforming means; and
- force applying means for positioning the deforming means in a preparatory position adjacent the U-shaped channel and for subsequently applying the binding force to the deforming means,
- wherein the deforming means comprises a fixed jaw;
- a movable jaw;
- connection means for movably connecting the fixed and movable jaws; and
- a movable support bed pivotably connected to the connection means.

6. A binding apparatus for binding a plurality of pages with a U-shaped channel member, comprising:

deforming means for deforming the U-shaped channel member to secure the plurality of pages into the U-shaped channel upon an application of a binding force to the deforming means; and force applying means for positioning the deforming means in a preparatory position adjacent the U-shaped channel and for subsequently applying the binding force to the deforming means, wherein the force applying means comprises a rotatable handle;

at least one pair of rollers rotatably supported on the handle;

a pair of face cams, positioned on either side of the handle, each face cam having at least one ramp portion;

lever means having a free end and a fixed end for rotationally-fixedly supporting the pair of face cams on the free end such that each at least one pair of rollers engages a corresponding one of the at least one ramp portion, wherein the lever means expand and contract at the free end as the at least one pair of rollers are moved along the corresponding ramp portion; and force transmitting means connected to the lever means for bearing against the deforming means, such that when the lever means expand and the deforming means are in the preparatory position, the deforming means is moved from the preparatory position to a deforming position, thereby deforming the U-shaped channel.

7. The binding apparatus of claim 6, wherein the lever means comprises at least one pair of lever arms, each pair consisting of a right lever arm and a left lever arm.

8. The binding apparatus of claim 7, wherein a flexibility of each lever arm is determined by controlling one of a width and a thickness of each lever arm.

9. The binding apparatus of claim 6, wherein the adjusting means comprises:

the force transmitting means, the force transmitting means comprising a cam bearing against the deforming means and pivoting means for pivotably connecting the cam to the lever means; and actuating means connected to the handle for rotating the pivoting means, wherein when the handle is moved from a first position to a second position, the cam moves the deforming means from an initial position to the preparatory position.

10. The binding apparatus of claim 9, wherein the pivoting means comprises:

a cam shaft rotatably supported by the lever means, the cam rotationally-fixed to the cam shaft; and a pinion gear supported on and rotationally fixed to the cam shaft.

11. The binding apparatus of claim 10, wherein the actuating means comprises:

a sector gear, rotatably supported on the lever means and engaged with the pinion gear.

a actuator arm engageable with the sector gear;

a spring connected at a first end to the actuator arm; and a spring link connected at a first end to a second end of the spring and at a second end to the handle, wherein when the handle is moved from the first position to the second position, the actuator arm moves laterally causing the sector gear to rotate, thereby causing the pivoting means to rotate the cam.

12. The binding apparatus of claim 11, wherein when the handle is moved from the second position to a third position, the spring expands such that the actuator arm does not move and the cam remains stationary, and the lever means expand, forcing the deforming means from the preparatory position to a deforming position, thereby deforming the U-shaped channel.

13. The binding apparatus of claim 11, wherein the gear ratio of the pinion gear to the sector gear is 10 to 1.

14. A binding apparatus for crimping a U-shaped channel around a plurality of pages to secure the pages therein, comprising:

jaw means for crimping the U-shaped channel; and force applying means for applying in a first stage of operation a positioning force to the jaw means to position the jaw means in a preparatory position adjacent the U-shaped channel, and applying in a second stage of operation a crimping force to the jaw means to crimp the U-shaped channel, wherein the jaw means comprises a fixed jaw;

a movable jaw;

a support bed; and connection means for movably connecting the fixed end of movable jaws to each other, the connection means comprising a pair of scissor arms connected to each other.

15. A binding apparatus for crimping a U-shaped channel around a plurality of pages to secure the pages therein, comprising:

jaw means for crimping the U-shaped channel; and force applying means for applying in a first stage of operation a positioning force to the jaw means to position the jaw means in a preparatory position adjacent the U-shaped channel, and applying in a second stage of operation a crimping force to the jaw means to crimp the U-shaped channel, wherein the jaw means comprises a fixed jaw;

a movable jaw;

a support bed; and connection means for movably connecting the fixed end of movable jaws to each other, the connection means comprising a pair of scissor arms, each scissor arm pivotably connected at a first end to one of the fixed and movable jaws and having a void formed at a second end, and a pair of pin members, each pin member extending through one of the voids to slidably connect one of the scissor arms to the other of the fixed and movable jaws.

16. A binding apparatus for crimping a U-shaped channel around a plurality of pages to secure the pages therein, comprising:

jaw means for crimping the U-shaped channel; and force applying means for applying in a first stage of operation a positioning force to the jaw means to position the jaw means in a preparatory position adjacent the U-shaped channel, and applying in a second stage of operation a crimping force to the jaw means to crimp the U-shaped channel, wherein the jaw means comprises a fixed jaw;

a movable jaw;

connection means for movably connecting the fixed and the movable jaws; and a support bed movable relative to the fixed and movable jaws and pivotably connected to the connection means.

17. A binding apparatus for crimping a U-shaped channel around a plurality of pages to secure the pages therein, comprising:

jaw means for crimping the U-shaped channel; and force applying means for applying in a first stage of operation a positioning force to the jaw means to position the jaw means in a preparatory position adjacent the U-shaped channel, and applying in a second stage of operation a crimping force to the jaw means to crimp the U-shaped channel, wherein the jaw means comprises a fixed jaw;

a movable jaw;

connection means for movably connecting the fixed and movable jaws; and biasing means for biasing the movable jaw away from the fixed jaw.

18. A binding apparatus for crimping a U-shaped channel around a plurality of pages to secure the pages therein, comprising:

jaw means for crimping the U-shaped channel; and force applying means for applying a first stage of operation a positioning force to position the jaw means in a preparatory position adjacent the U-shaped channel, and for applying in a second stage of operation a crimping force to the jaw means to crimp the U-shaped channel, wherein the force applying means comprises adjusting means for moving the jaw means to the preparatory position;

lever means for supporting the adjusting means, the lever means having a free end and a fixed end;

lever expanding means supported on the free end of the lever means for forcing apart the lever means; and force transmitting means for transmitting the positioning force and the crimping force to the jaw means.

19. The binding apparatus of claim 18, wherein the lever expanding means comprises:

a pair of face cams, each face cam having at least one ramp portion;

a corresponding pair of rollers for each at least one ramp portion; and a rotatable handle, each pair of rollers rotatably supported by the handle to engage the corresponding ramp portion, wherein the lever means is forced apart as the pair of rollers move up the ramp portions.

20. The binding apparatus of claim 18, wherein the force applying means comprises:

a cam shaft pivotably supported by the lever means;

a cam fixedly connected to the cam shaft, a bearing surface of the cam contacting the jaw means; and a pinion gear, wherein the first stage of operation the cam shaft is pivoted to an adjusting position, thereby moving the jaw means adjacent the U-shaped channel, and in the second stage of operation the cam remains in the adjusting position, and moves laterally with the lever means as the lever means is forced apart to apply the crimping force to the jaw means.

21. The binding apparatus of claim 18, wherein the adjusting means further comprises:

a sector gear rotatably supported on the lever means, and engaged with a gear means of the force transmitting means;

an actuator arm engageable with the sector gear;

a spring connected at a first end to the actuator arm and at a second end to a spring link;

a second end of the spring link connected to the lever expanding means;

wherein in the first stage of operation, the lever expanding means are moved from a first position to a second position, thereby moving the actuating arm laterally to rotate the sector gear, thereby rotating the force transmitting means to move the jaw means to the preparatory position.

22. A method for binding a plurality of pages into a channel member, comprising the steps of:

(a) positioning the channel member and a plurality of pages into a deforming means;

(b) automatically adjusting the deforming means into a preparatory position adjacent the U-shaped channel from an initial position;

(c) moving the deforming means from the preparatory position to a deforming position, thereby deforming the channel member and securing the plurality of pages therein;

(d) returning the deforming means to the initial position; and (e) repeating steps (b)-(d) at least once to further deform the channel member until the channel member is sufficiently deformed to secure the plurality of pages therein.

23. A debinding apparatus for debinding a plurality of pages from a crimped U-shaped channel, comprising:

a movable member;

a force apply means for applying a force against the movable member;

a pair of movable debinding arms, engageable with the moving member such that the force is transferred to the debinding arms; and a wedge member, engageable with the pair of debinding arms and situated within the U-shaped channel, such that the U-shaped channel is uncrimped upon an application of force by the force applying means.

24. A method for debinding a plurality of pages bound into a crimped U-shaped channel, comprising the steps of:

(a) inserting a wedge member into the crimped U-shaped channel;

(b) engaging the wedge member with a movable force transmitting means, the force transmitting means engageable with a movable member;

(c) generating a positioning force to engage the movable member with the force transmitting means;

(d) generating a debinding force for forcing the wedge member into the crimped U-shaped channel, thereby partially uncrimping the U-shaped channel by moving the moveable member; and (e) repeating steps (c) and (d) at least once until the plurality of pages are debound from the U-shaped channel.

* * * * *